(12) United States Patent
Gaide

(10) Patent No.: US 8,893,071 B1
(45) Date of Patent: Nov. 18, 2014

(54) METHODS OF PIPELINING A DATA PATH IN AN INTEGRATED CIRCUIT

(71) Applicant: Xilinx, Inc., San Jose, CA (US)

(72) Inventor: Brian C. Gaide, Erie, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/941,224

(22) Filed: Jul. 12, 2013

(51) Int. Cl.
*G06F 17/50* (2006.01)
(52) U.S. Cl.
CPC .................................. *G06F 17/5072* (2013.01)
USPC ............ 716/134; 716/113; 716/123; 716/132
(58) Field of Classification Search
USPC .................... 716/113, 123, 132, 134
See application file for complete search history.

(56) References Cited

U.S. PATENT DOCUMENTS

| | | | | |
|---|---|---|---|---|
| 6,058,266 | A * | 5/2000 | Megiddo et al. | 717/156 |
| 6,429,681 | B1 * | 8/2002 | Hutton | 326/41 |
| 6,480,991 | B1 * | 11/2002 | Cho et al. | 716/122 |
| 6,920,625 | B2 * | 7/2005 | Gass | 716/113 |
| 7,017,043 | B1 * | 3/2006 | Potkonjak | 713/176 |
| 7,120,883 | B1 * | 10/2006 | van Antwerpen et al. | 716/102 |
| 7,162,704 | B2 * | 1/2007 | Oktem | 716/114 |
| 7,584,443 | B1 * | 9/2009 | Govig et al. | 716/113 |
| 7,979,827 | B1 | 7/2011 | Trimberger et al. | |
| 8,104,014 | B2 * | 1/2012 | Puri et al. | 716/134 |
| 8,677,298 | B1 * | 3/2014 | Manohararajah et al. | 716/116 |

OTHER PUBLICATIONS

Hurst, Aaron P. et al., "Fast Minimum-Register Retiming via Binary Maximim-Flow," *Proc. of the 2007 Formal Methods in Computer Aided Design*, FMCAD '17, Nov. 11, 2007, pp. 181-187, IEEE, Piscataway, New Jersey, USA.

* cited by examiner

*Primary Examiner* — Naum B Levin
(74) *Attorney, Agent, or Firm* — John J. King

(57) ABSTRACT

A method of pipelining a data path in an integrated circuit is described. The method comprises receiving a circuit design to be implemented in the integrated circuit device; providing a placement of the circuit design in the integrated circuit device; identifying a most critical path of the placement; adding pipeline registers to the most critical path; and adding pipeline registers to all paths that are parallel to the most critical path. A computer program product for pipelining a data path in an integrated circuit is also described.

20 Claims, 10 Drawing Sheets

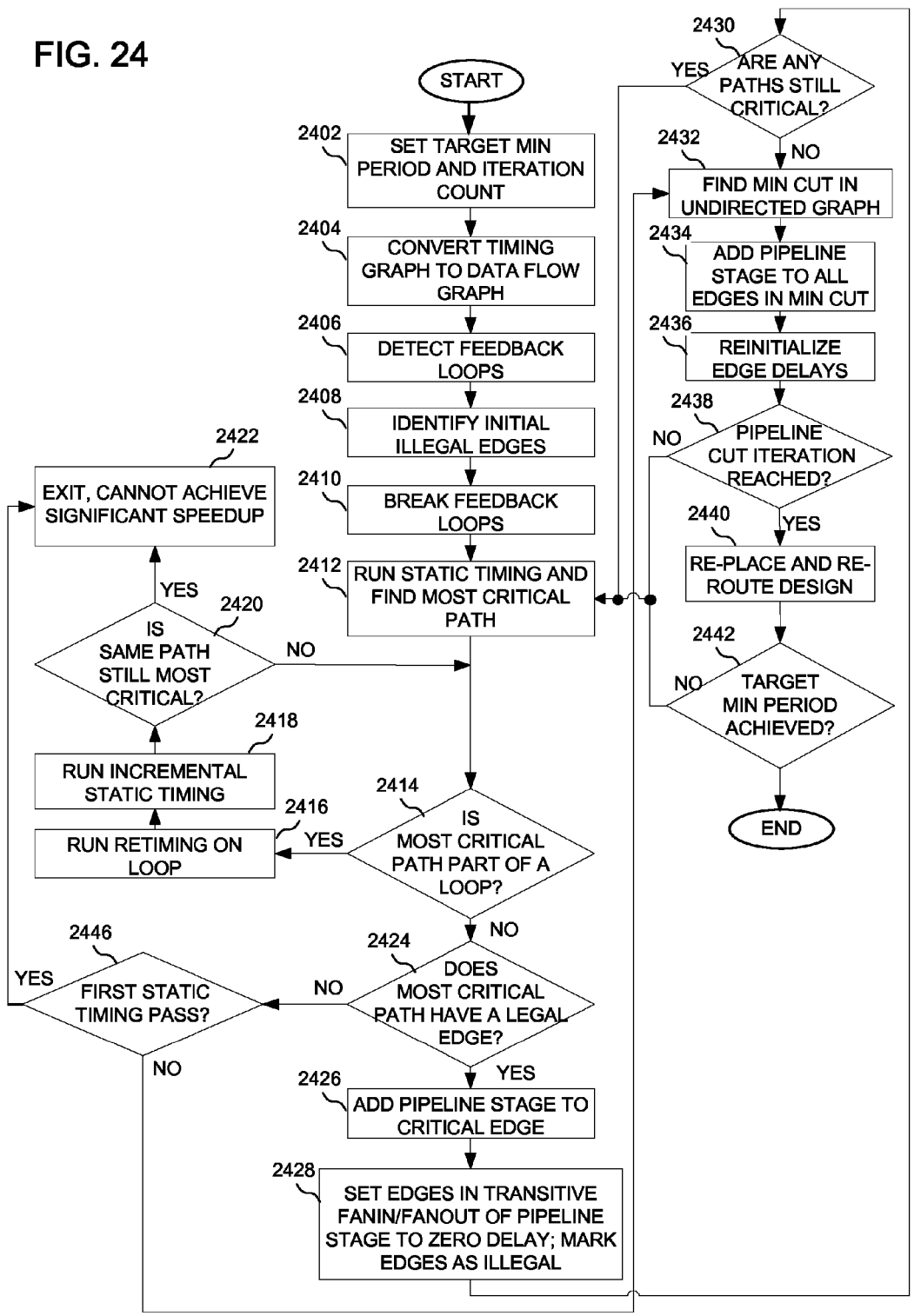

METHODS OF PIPELINING A DATA PATH IN AN INTEGRATED CIRCUIT

TECHNICAL FIELD

The present invention relates generally to integrated circuit devices, and in particular, to a method of pipelining a data path in an integrated circuit device.

BACKGROUND

Data transmission is an important application of many integrated circuit devices. Data may be transmitted according to different transmission protocols, and may be transmitted as serial data or parallel data. Data may also be transmitted within a circuit between registers (e.g., flip-flops), such as through combinatorial logic or programmable elements. Because the transmission speed of data is important, the layout of circuit elements in paths that transmit data is important. Certain circuits may depend upon a number of paths that are provided in parallel, where the timing of receiving data is important. One way to improve the speed of the transmission of data in a circuit is to provide pipelining.

Conventional pipelining techniques typically formulate a linear programming (LP) retiming problem and solve it for a specified maximum frequency to minimize register count. One problem with this type of technique is that it includes runtimes that grow exponentially with the number of paths in the design. Conventional pipelining techniques assume an infinite number of registers are available and, when applied to FPGAs, could saturate the available registers (either locally or globally) before finishing an iteration. Further, some of the most critical signals may not be pipelined. Conventional techniques also attempt to solve the entire problem in one iteration without changing placement intermediately, leading to a larger number of registers required to meet a given cycle time, or where the cycle time may not be met.

SUMMARY

A method of pipelining a data path in an integrated circuit device is described. The method comprises receiving a circuit design to be implemented in the integrated circuit device; providing a placement of the circuit design in the integrated circuit device; identifying a most critical path of the placement; adding pipeline registers to the most critical path; and adding pipeline registers to all paths that are parallel to the most critical path.

According to another method, the method of pipelining a data path in an integrated circuit comprises receiving a circuit design to be implemented in the integrated circuit device; providing a placement of the circuit design in the integrated circuit device; identifying a most critical path of the placement; adding pipeline registers to the most critical path; performing a minimum cut on a graph representing the circuit design to find the minimum number of registers required to balance the paths that are parallel to the most critical path; and interleaving a re-placement of the circuit design with one or more iterations of adding pipeline registers to generate a pipelined placement of the circuit design.

A computer program product is also described. The computer program product comprises a non-transitory computer-readable medium comprising computer-readable program code that transforms a circuit design to a placement configuration, the computer readable program code comprising computer-readable program code that receives a circuit design to be implemented in circuit blocks and memory elements of an integrated circuit; computer-readable program code that provides a placement of the circuit design in the integrated circuit device; computer-readable program code that identifies a most critical path of the placement; computer-readable program code that adds pipeline registers to the most critical path; and computer-readable program code that adds pipeline registers to critical paths that are parallel to the most critical path.

BRIEF DESCRIPTION OF THE DRAWINGS

FIG. 24 is a more detailed flow chart showing a method of pipelining data.

DETAILED DESCRIPTION

Figure 1:
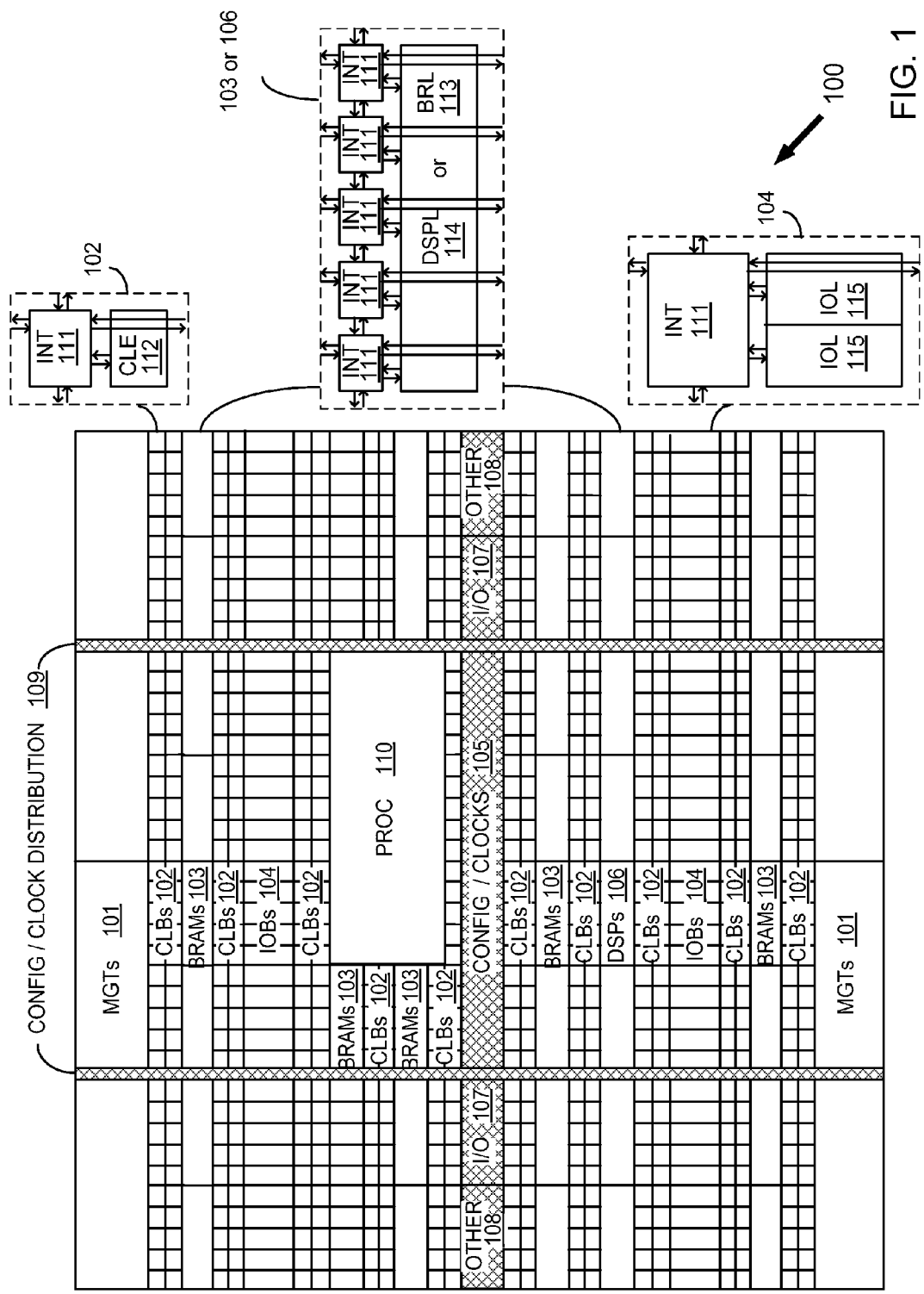
FIG. 1 is a block diagram of a device having programmable resources.

Turning first to FIG. 1, a block diagram of a device having programmable resources is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 1 comprises an FPGA architecture 100 having a large number of different programmable tiles including multi-gigabit transceivers (MGTs) 101, CLBs 102, random access memory blocks (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., configuration ports and clock ports), and other programmable logic 108 such as digital clock managers, analog-to-digital converters, system monitoring logic, and so forth. Some FPGAs also include dedicated processor blocks (PROC) 110, which may be used to implement a software application, for example.

In some FPGAs, each programmable tile includes a programmable interconnect element (INT) 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 may include a configurable logic element (CLE) 112 that may be programmed to implement user logic plus a single programmable interconnect element 111. A BRAM 103 may include a BRAM logic element (BRL) 113 in addition to one or more programmable interconnect elements. The BRAM includes dedicated memory separate from the distributed RAM of a configuration logic block. Typically, the number of interconnect elements included in a tile depends on the height of the tile. In the pictured example, a BRAM tile has the same height as five CLBs, but other numbers may also be used. A DSP tile 106 may include a DSP logic element (DSPL) 114 in addition to an appropriate number of programmable interconnect elements. An IOB 104 may include, for example, two instances of an input/output logic element (IOL) 115 in addition to one instance of the programmable interconnect element 111. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured example, a columnar area near the center of the die is used for configuration, clock, and other control logic. The config/clock distribution regions 109 extending from this column are used to distribute the clocks and configuration signals across the breadth of the FPGA. Some FPGAs utilizing the architecture illustrated in FIG. 1 include additional logic blocks that disrupt the regular columnar structure making up a large part of the FPGA. The additional logic blocks may be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear in order to facilitate the efficient implementation of user logic. While the example of FIG. 1 relates to an integrated circuit having programmable resources, it should be understood that the circuits and methods set forth in more detail below could be implemented in any type of ASIC.

Figure 2:
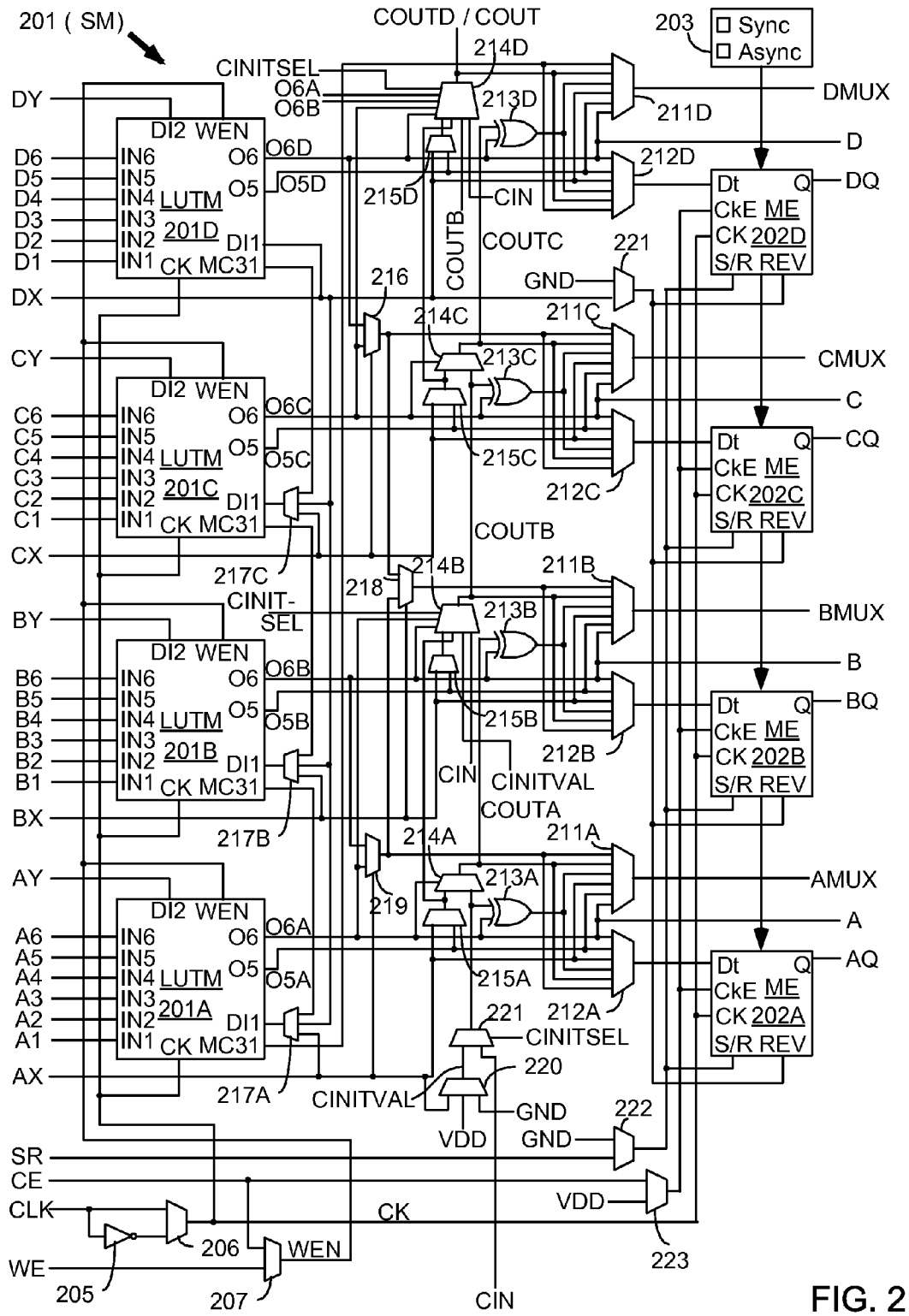
FIG. 2 is a block diagram of a configurable logic element of the device of FIG. 1.

Turning now to FIG. 2, block diagram of a configurable logic element of the device of FIG. 1 is shown. In particular, FIG. 2 illustrates in simplified form a configurable logic element of a configuration logic block 102 of FIG. 1. In the example of FIG. 2, slice M 201 includes four lookup tables (LUTMs) 201A-201D, each driven by six LUT data input terminals A1-A6, B1-B6, C1-C6, and D1-D6 and each providing two LUT output signals O5 and O6. The O6 output terminals from LUTs 201A-201D drive slice output terminals A-D, respectively. The LUT data input signals are supplied by the FPGA interconnect structure via input multiplexers, which may be implemented by programmable interconnect element 211, and the LUT output signals are also supplied to the interconnect structure. Slice M also includes: output select multiplexers 211A-211D driving output terminals AMUX-DMUX; multiplexers 212A-212D driving the data input terminals of memory elements 202A-202D; combinational multiplexers 216, 218, and 219; bounce multiplexer circuits 222-223; a circuit represented by inverter 205 and multiplexer 206 (which together provide an optional inversion on the input clock path); and carry logic having multiplexers 214A-214D, 215A-215D, 220-221 and exclusive OR gates 213A-213D. All of these elements are coupled together as shown in FIG. 2. Where select inputs are not shown for the multiplexers illustrated in FIG. 2, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 2 for clarity, as well as from other selected figures herein.

In the pictured example, each memory element 202A-202D may be programmed to function as a synchronous or asynchronous flip-flop or latch. The selection between synchronous and asynchronous functionality is made for all four memory elements in a slice by programming Sync/Asynch selection circuit 1503. When a memory element is programmed so that the S/R (set/reset) input signal provides a set function, the REV input terminal provides the reset function. When the memory element is programmed so that the S/R input signal provides a reset function, the REV input terminal provides the set function. Memory elements 202A-202D are clocked by a clock signal CK, which may be provided by a global clock network or by the interconnect structure, for example. Such programmable memory elements are well known in the art of FPGA design. Each memory element 202A-202D provides a registered output signal AQ-DQ to the interconnect structure. Because each LUT 201A-201D provides two output signals, O5 and O6, the LUT may be configured to function as two 5-input LUTs with five shared input signals (IN1-IN5), or as one 6-input LUT having input signals IN1-IN6.

In the example of FIG. 2, each LUTM 201A-201D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 217A-217C for LUTs 201A-201C), or to the two 32-bit RAMs via input terminals DI1 and DI2. RAM write operations in the LUT RAMs are controlled by clock signal CK from multiplexer 206 and by write enable signal WEN from multiplexer 207, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 201A may also be provided to the general interconnect structure for shift register chaining, via output select multiplexer 211D and CLE output terminal DMUX. Accordingly, the circuits and methods set forth below may be implemented in a device such as the devices of FIGS. 1 and 2, or any other suitable device.

Figure 3:
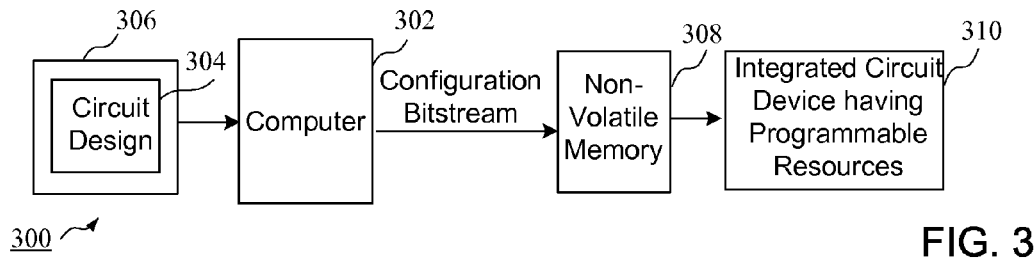
FIG. 3 is a block diagram of a system for programming a device having programmable resources.

Turning now to FIG. 3, a block diagram of a system for programming a device having programmable resources is shown. In particular, a computer 302 is coupled to receive a circuit design 304 from a memory 306 and generates a configuration bitstream, which is stored in the non-volatile memory 306. As will be described in more detail below, the circuit design may be a high level design, such as a circuit design defined in a hardware description language (HDL). Also, the computer may be configured to run software that generates a configuration bitstream, which is stored in the non-volatile memory 308 and provided to an integrated circuit 310 that may be a programmable integrated circuit, such as the integrated circuit described below in FIG. 3. As will be described in more detail below, bits of the configuration bitstream are used to configure programmable resources of the integrated circuit.

Figure 4:
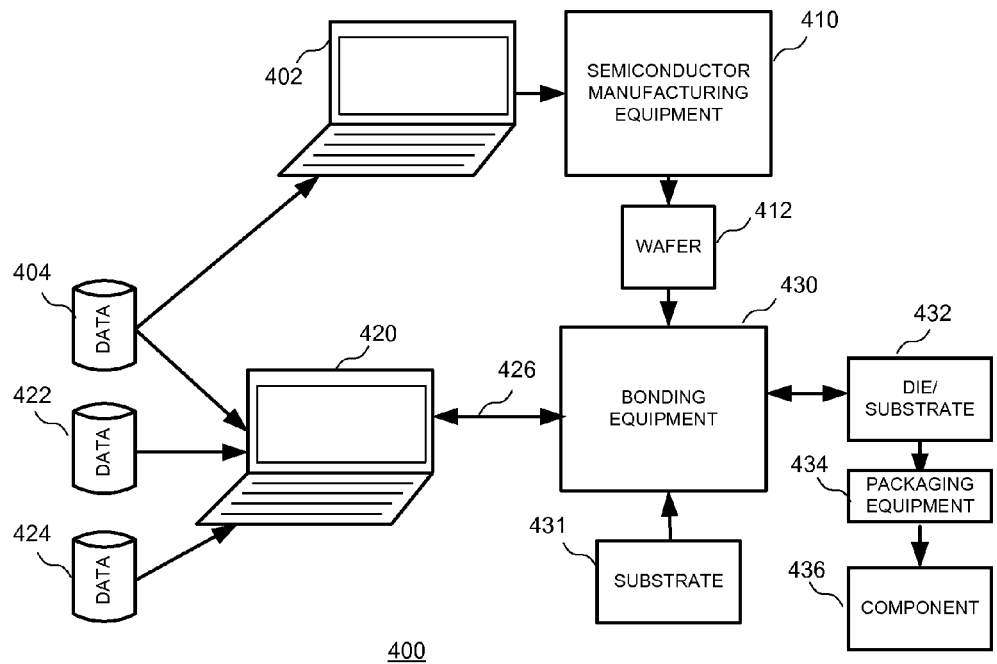
FIG. 4 is a system for producing a device such as the device having pipelined resources as set forth below.

Turning now to FIG. 4, a system for producing a device such as the device implementing methods of pipelining as set forth below is shown. The system 400 comprises computer-aided design (CAD) equipment 402, which could be any computer adapted to run CAD software. The CAD equipment 402 receives data, such as a master pinlist 404, and is coupled by a communication link 406 to semiconductor manufacturing equipment 410. The semiconductor manufacturing equipment 410 generates a wafer 412 having a plurality of die, as is well known in the art.

CAD equipment 420, which is also coupled to receive the master pinlist 404, receives a bonding diagram 422 and substrate artwork 424. The CAD equipment 420 is coupled by a communication link 426 to bonding equipment 430. The communication links 406 and 426 could be any wired or wireless communication link. The bonding equipment generally provides wire bonds from a die from the wafer 412 to a substrate receiving the die, as will be described in more detail in reference to other figures. The die/substrate 432 is coupled to packaging equipment 434 that generates a finished component 436, such as an integrated circuit package. The system of FIG. 4 enables the manufacture of an integrated circuit package having pipelining according to the various circuits and methods set forth below. Although the system of FIG. 4 provides various elements required for producing an integrated circuit package, it should be understood the elements shown in FIG. 4 could be combined, or additional elements could be provided.

Figure 5:
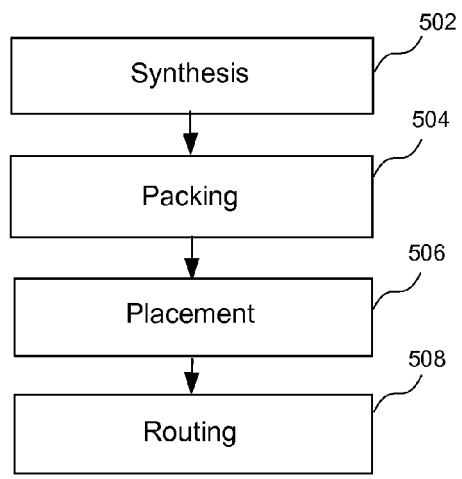
FIG. 5 is a flow chart showing a method of generating a circuit design implementing methods of pipelining as set forth below.

Turning now to FIG. 5, a flow chart shows a general method of generating a circuit design implementing methods of pipelining as set forth below. The software flow for implementing a circuit design in a device having programmable resources includes synthesis, packing, placement, and routing. Synthesis comprises converting a circuit design in a high-level design to a configuration of the elements found in the device that is to receive the circuit design. For example, a synthesis tool operated by the computer 302 may implement portions of a circuit design enabling certain functions in CLBs or DSP blocks, as will be described in more detail below. An example of a synthesis tool that may implement conventional methods of synthesis, packing, placement, and routing is the ISE tool available from Xilinx, Inc. of San Jose Calif.

Packing comprises grouping portions of the circuit design into defined blocks, such as CLBs, of a device. Placing comprises determining the location of the blocks of the device to receive the circuits defined during packing, wherein the blocks in a design may be placed on the two-dimensional grid associated with specific elements of the device. Placement is performed by a placer, which may include placement software running on a computer, or a portion of a larger software package running on a computer for implementing a circuit design in a device. Finally, routing comprises selecting paths of interconnect elements, such as programmable interconnects in a device having programmable elements.

The various methods set forth below may be used to pipeline FPGA designs. It is assumed that only a finite number of pipelining registers are available, and thus the most critical signals are pipelined first. Pipelining and re-placement are also interleaved to achieve more optimal results. More particularly, a method of pipelining uses an iterative based approach that first pipelines the most critical paths to ensure a higher likelihood of getting an available unused register in the vicinity of where it is needed. Between each pipelining iteration, the software can re-place portions of the design to allow the software to take advantage of extra slack gained by pipelining certain paths, leading to fewer registers needed to achieve a given maximum frequency (fmax) target (i.e., a frequency at which the design is functionally correct). The method may use a binary max flow graph formulation to find the minimum number of registers required during each iteration, which has a runtime complexity that is significantly less than the exponential complexity of LP placement. It is determined empirically that only a limited number of iterations is necessary to find the optimal solution to our existing architecture. As will be described in more detail below, techniques are employed to ignore certain parts of the timing graph where registers cannot be placed due to architectural constraints.

Because integrated circuit devices such as FPGAs have limited register resources, it is necessary not only to find an unused register to pipeline a design, but also desirable to find one in the vicinity of where it is needed. Otherwise, there are routing delay penalties to and from the added register that may eliminate the advantage of pipelining a given path. Therefore, preferential treatment is given to the most critical paths. For example, the method iteratively finds a single cut in the timing graph that pipelines the currently most critical path along with any other parallel critical paths, and then fills in the remainder of the cut with the minimum number of registers required to complete the cut (i.e., to balance the number of pipeline stages on all remaining paths). In this way, the most critical paths are more likely to be pipelined with registers in their local areas. After a single cut or series of cuts, the design is re-placed, either incrementally or fully. Incrementally re-placing the design allows the placer to take advantage of the fact that the pipelined paths have more slack than before, giving the design more degrees of placement freedom and reducing the number of iterations required to meet a target maximum frequency. Since the design is logically correct after each cut in the graph, intermediate results can also be used if the desired fmax cannot be met.

Therefore, pipelining the most critical paths first to reduce routing delay penalties to these paths, and then filling in the remainder of the cut with the minimal amount of registers to minimize resource costs, improves pipelining efficiency, and reduces the number of registers required for pipelining. By interleaving one or multiple graph cuts between re-placements, the number of cuts required to meet a maximum frequency target is reduced. Further, the incorporation of illegal edge detection enables the algorithms to run on the timing graph directly without removing timing arcs where pipelining would be illegal.

Figure 6:
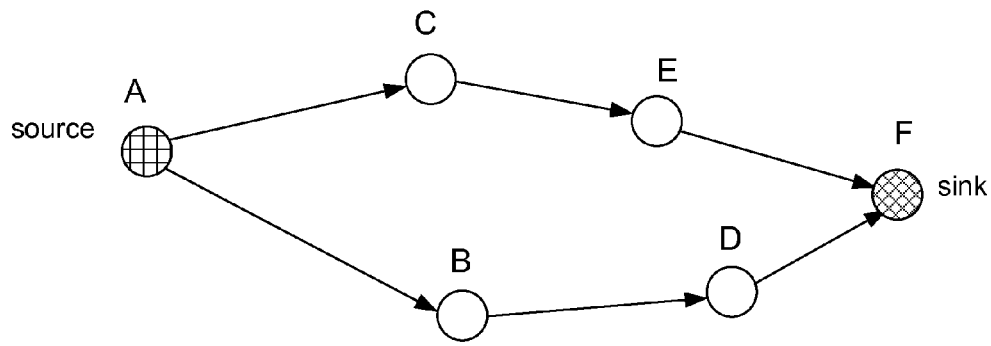
FIG. 6 is a data flow graph showing paths among nodes between a source node and a destination node.
Figure 7:
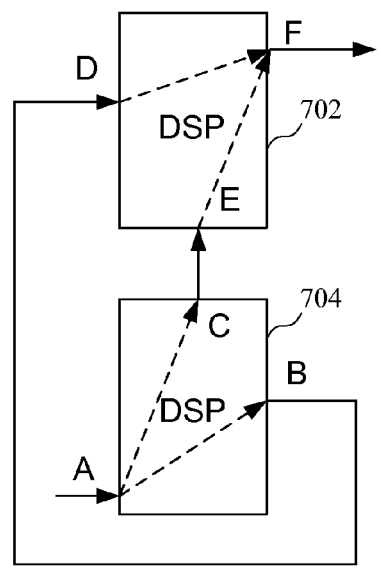
FIG. 7 is a block diagram of circuit elements having nodes corresponding nodes of FIG. 6.
Figure 8:
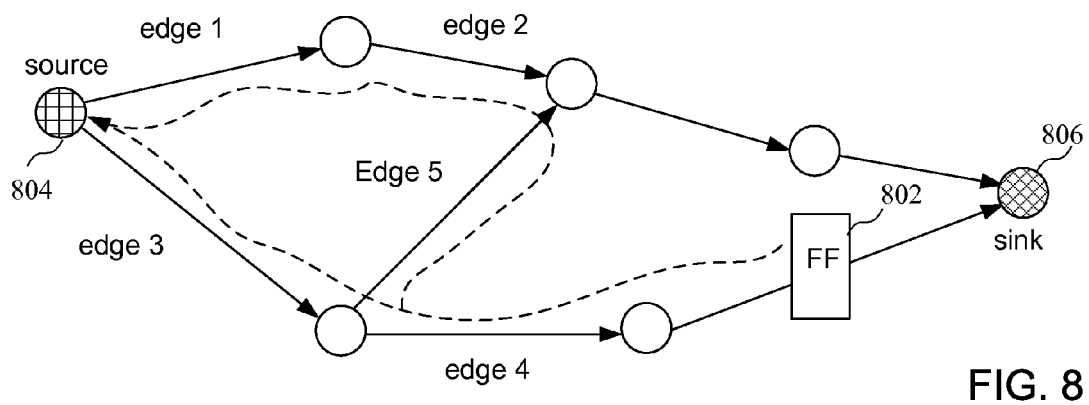
FIG. 8 is a data flow graph showing the determination of illegal edges.

Referring specifically now to FIGS. 6-21, data flow graphs are provided to enable showing different steps of pipelining data paths. In particular, FIGS. 6 and 7 show two paths between source and sink nodes A and F having intermediate nodes B-E associated with two paths between the source and sink nodes. The source and sink nodes could be elements that receive a clock signal to synchronously transmit a signal. By way of example, the source and sink nodes A and F could be programmable resource elements, such as programmable resource elements described above in reference to FIGS. 1 and 2, for example. The various nodes B-E between the source and sink nodes A and F could be routing elements or other elements associated with combinatorial logic (e.g., multiplexers or programmable interconnect points and non-interconnect circuits, such as LUTs, carry chains, etc.) that enable the transmission of data between the source and sink nodes.

For purposes of describing various steps of pipelining paths between a source node and a sink node, an example of two elements having nodes that could be represented by the nodes of a data graph of FIG. 6 are shown in FIG. 7. The data graphs set forth below show a static timing view, where data paths are considered, but clock delays are generally ignored for simplicity. That is, clock paths are detected in order to avoid pipelining the clock paths. Two DSP blocks 702 and 704, such as DSP blocks of FIG. 1, are coupled together, where various connections between nodes representing internal connections and external connections of the DSP blocks between nodes are shown. For example, internal connections between each of the input nodes D and E and an output node F of a first DSP element 702 as well as internal connections between an input node A and output nodes B and C are shown. Connections that are external to the DSP elements 7602 and 704 are also shown. For example, a connection between an output C of DSP element 704 and an input E of DSP element 702 is shown. A second connection between output B of the DSP element 704 and an input D of the DSP element 702 is also shown.

The example of FIG. 7 is provided to highlight how certain connections between nodes are not able to be pipelined. For example, each of the edges A-C, A-B, D-F and E-F represent internal edges of the DSP elements, and are therefore not edges that could be pipelined. Similarly, edge C-E is an edge between the two DSP elements 702 and 704 that may not be accessible, such as a carry line for example. That is, it is not possible to provide pipelining between two nodes that would not enable implementing a register between the nodes. Accordingly, any edges that cannot be pipelined are designated as illegal edges. However, edge B-D of FIG. 7 is an interconnect edge would could be pipelined and therefore represents a "legal edge." It should be noted that nodes may have multiple signals flowing into or out of a node, and edges represent the timing path between nodes. While the example of FIG. 7 having two DSP blocks is provided to indicate how certain edges may be legal or illegal, it should be understood that other circuit arrangements may have many more elements between nodes. According to another example, if pipeline stages can only be added to interconnect routes, a path entirely encapsulated in a BRAM that reconverges with an interconnect path would preclude adding registers to the interconnect path. As will be described in more detail below in reference to FIGS. 9-14, efficient pipelining is selectively provided by the addition of registers in legal edges between the source and sink nodes according to various techniques. However, an example of "legal" and "illegal" edges will first be described in reference to FIG. 8.

In order to determine where registers may be added in a data graph, the data graph must be analyzed to determine "legal" and "illegal" edges, where registers can only be added to legal edges. Edges may become illegal after adding a register. Data graphs, such as the data graph of FIG. 8, may analyzed to determine legal and illegal edges as a directed graph (i.e., a data graph where the flow of data is analyzed in one direction from node to node) or as an undirected graph (i.e., a data graph where the flow of data is analyzed in either direction from node to node). As shown for example in FIG. 8, a pipelining register 802 is included in a path between a source 804 and a sink 806, where edge 5 is illegal. For example, edge 3 and 4 are illegal because they are in series with the edge 5. Edges 1 and 2 also are illegal because, according to one path shown by a backwards traversal from the register 802 to the source node 804, it would be necessary to pass through an illegal edge (i.e., edge 5). That is, the illegal edges 1, 2 and 4 are determined by a reverse traversal through the paths from the register 802 to source node 804. While FIG.

8 shows one example of determining illegal edges, it should be understood that other methods could be implemented to determine illegal edges.

Figure 9:
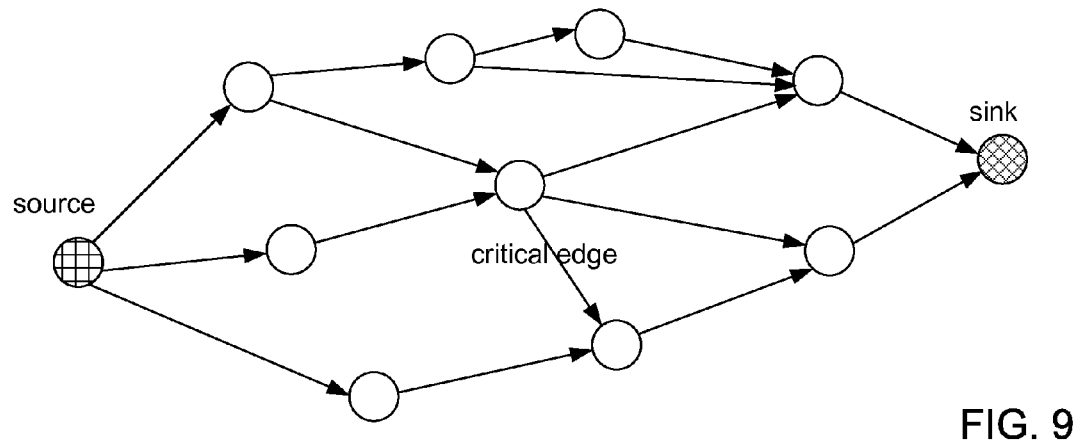
FIG. 9 is a data flow graph showing nodes between a source and sink and showing a critical edge.

One important step in determining where to most efficiently provide registers in a data path between a source and sink node is to establish a minimum cut in a series of paths of a circuit arrangement between a source node and a sink node. Steps in determining where to provide a minimum cut are described in reference to the data graphs of FIGS. 9-13, and a final pipelined version of the circuit arrangement is provided in FIG. 14. A critical edge of a circuit arrangement is determined, as shown in FIG. 9. Because critical paths are well known after placement (as opposed to after synthesis), the steps of FIGS. 9-14 are implemented after placement of the circuit elements. It is beneficial to pipeline the most critical paths first because there is a greater likelihood of being able to use nearby registers in the path, which will achieve the goal of the pipelining. That is, the pipelining is intended to improve the speed of the transfer of data in the circuit. If delays are created in the transfer of data as a result of registers provided in a data path that are far from the source or sink of the data path, it would defeat the purpose of pipelining. A critical edge can be selected to be an edge near the middle of a most critical path. The most critical path can be determined based upon a comparison of data paths between the source and sink to determine which path has the least amount of slack (i.e., the difference between the time required for data to traverse a path and the maximum allowable time for data to arrive at a sink node), and which path would benefit the most from pipelining in the path.

Figure 10:
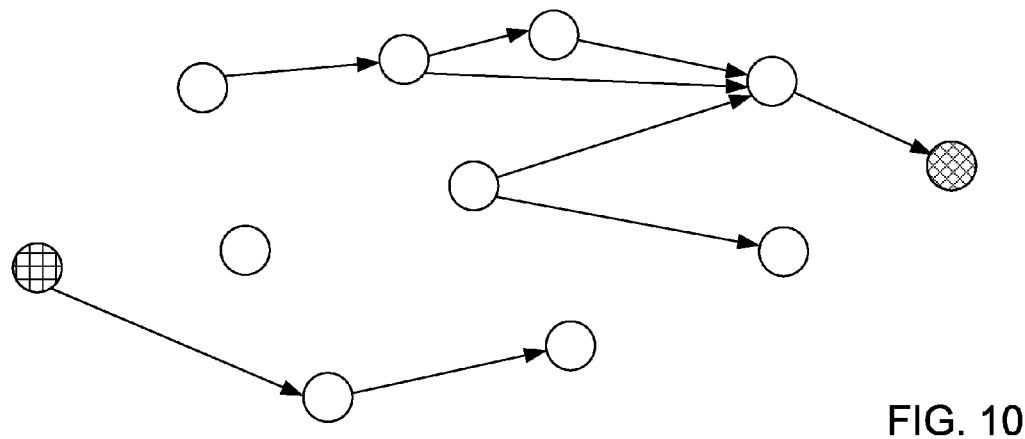
FIG. 10 is a data flow graph showing a first step of removing critical path fan-ins and fan-outs for implementing a minimum cut technique to enable pipelining the data flow graph of FIG. 9.
Figure 11:
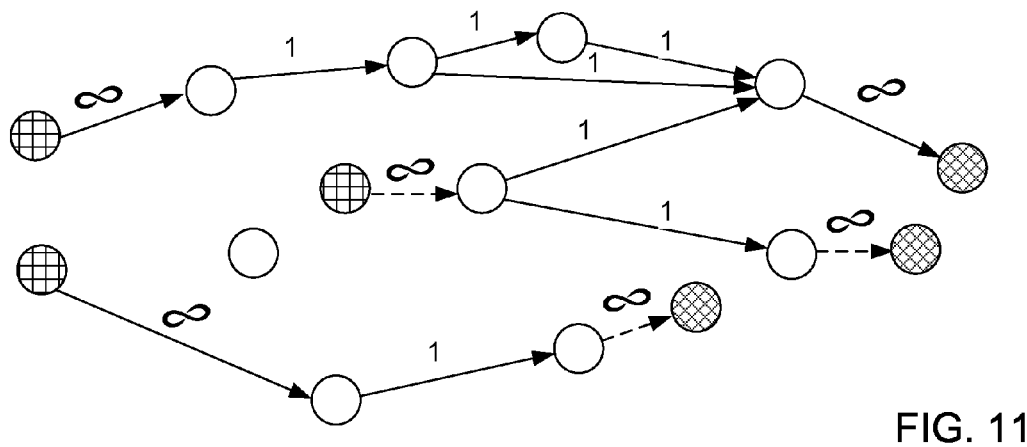
FIG. 11 is a data flow graph showing a second step of adding sources and sinks to dangling paths for implementing a minimum cut technique to enable pipelining the data flow graph of FIG. 9.

Once the critical edge is determined, it is eliminated from the circuit, and the "fan-in" and "fan-outs" of the critical path are removed, as shown in FIG. 10. Sources and sinks are then added to the dangling paths (i.e., paths that are not connected to both a source and a sink), and a capacity of "1" is assigned to each edge (except for source and sink connections, which are assigned a value of infinity), as shown in FIG. 11. Assigning a value of infinity to certain edges insures that a cut (which attempts to minimize the total edge capacity that gets cut) will occur elsewhere. The goal is to pipeline as many critical and near critical paths as possible in one cut, and find the minimum amount of registers to complete the remainder of the cut.

Figure 12:
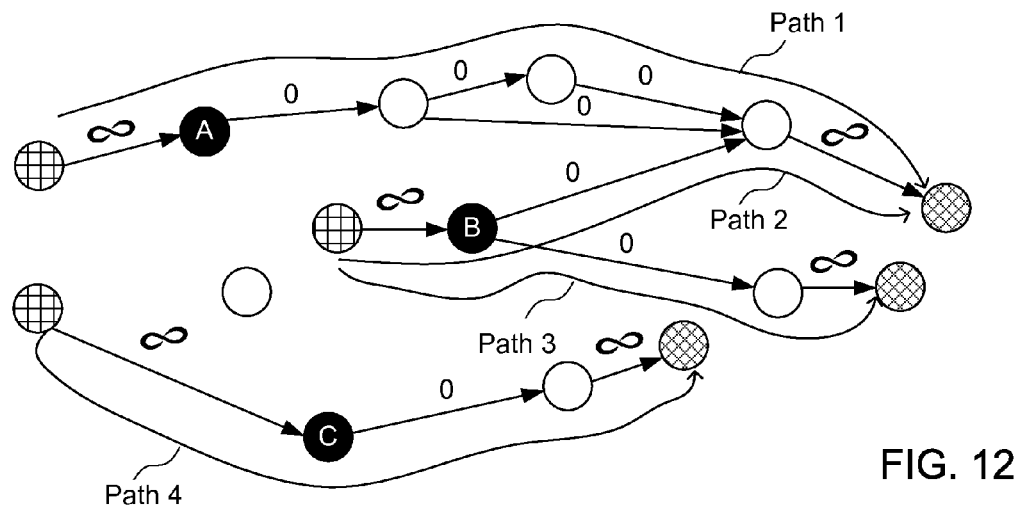
FIG. 12 is a data flow graph showing the designation of paths between sources and sinks of the data flow graph of FIG. 9.

Paths are then traversed, as shown in FIG. 12. Whenever an edge of a path (other than an edge that is assigned a value of infinity) is traversed, a value of zero is assigned to the path. That is, by reassigning a value of an edge to zero after it has been traversed, and not traversing edges having a value of zero, an edge is traversed only once. Nodes that can be reached by residual flow from a source node are then designated (shown here as nodes A, B and C). Various techniques can be implemented for determining the paths between a source and sink node, such as an augmenting path algorithm or Dinic's blocking flow algorithm, for example.

Figure 13:
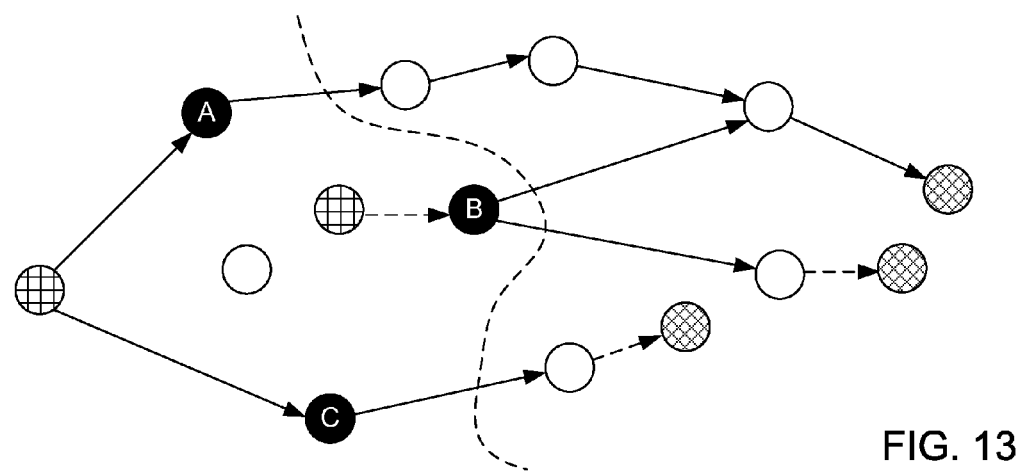
FIG. 13 is a data flow graph showing a minimum cut in the data flow graph of FIG. 12.

In order to minimize the number of registers that are added, a cut is then made in each path between the designated nodes A, B and C and the following registers in the paths, as shown in FIG. 13. Adding registers to the parallel paths as shown will provide the most efficient use of registers for pipelining. That is, by selectively placing a register in a certain locations in a path, the register will provide a benefit to any paths with converge into the path receiving the register, providing the most efficient use of registers. That is, by selectively placing pipelining registers as close to the sink node as possible by the minimum cut procedure, more parallel paths coupled to paths having the pipelined registers will benefit from the pipelined registers, thereby reducing the number of required pipelined registers.

Figure 14:
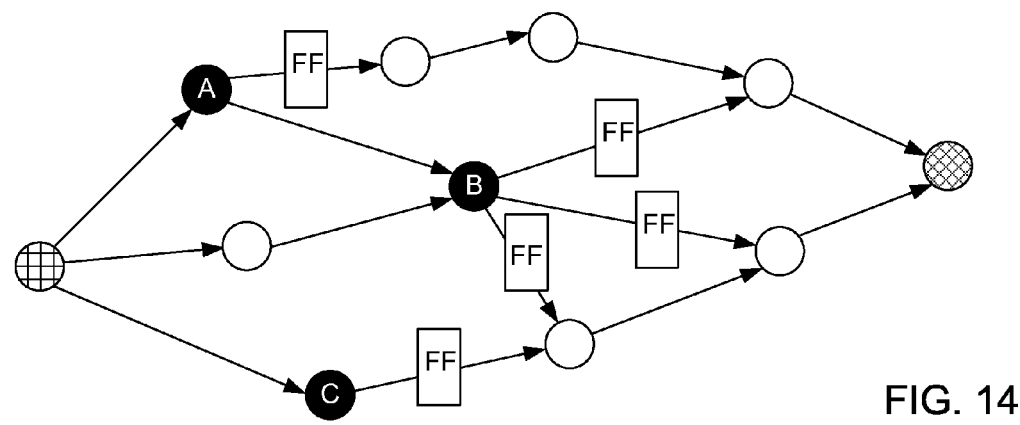
FIG. 14 is a data flow graph showing a final pipelined implementation of the data flow graph of FIG. 9.

As will be described in more detail below, an iterative approach is used to reduce the overall number of registers that are added. That is, when performing placement after registers are added, the placement finds slack in new places and more degrees of freedom in the placement process, leading to an overall reduction in the number of registers that are added. FIG. 14 shows the resulting circuit arrangement having the added registers, including the critical edge also having a register.

Figure 15:
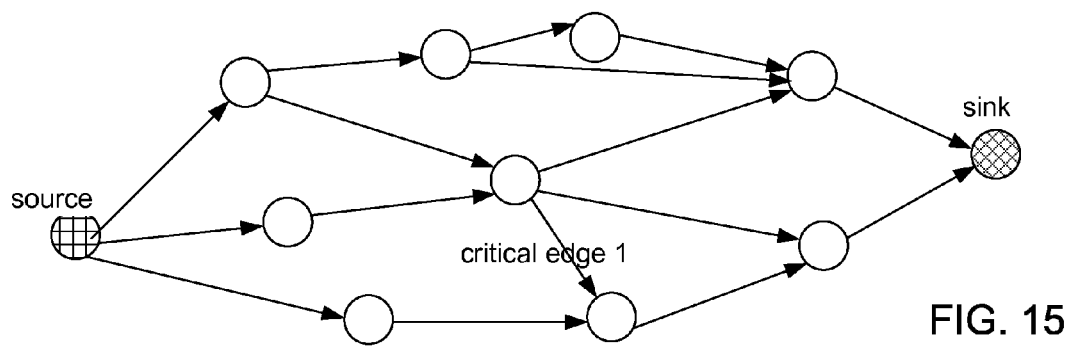
FIG. 15 is a data flow graph showing nodes between a source and a sink and showing two critical edges.
Figure 16:
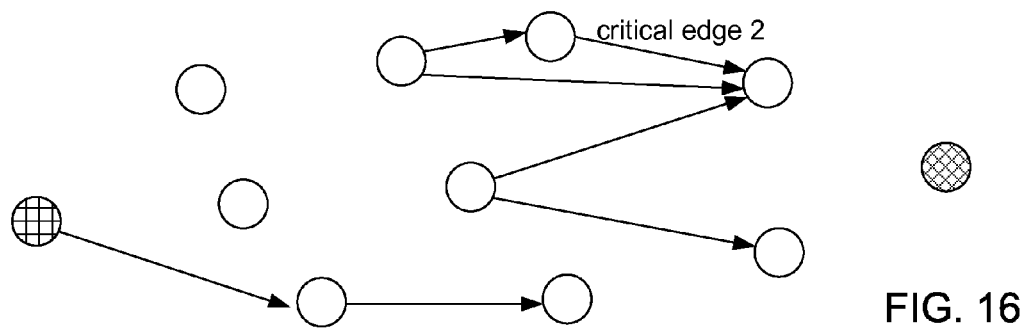
FIG. 16 is a data flow graph showing a first step of removing critical path fan-ins and fan-outs and identifying a second critical edge for implementing a minimum cut technique to enable pipelining the data flow graph of FIG. 15.
Figure 17:
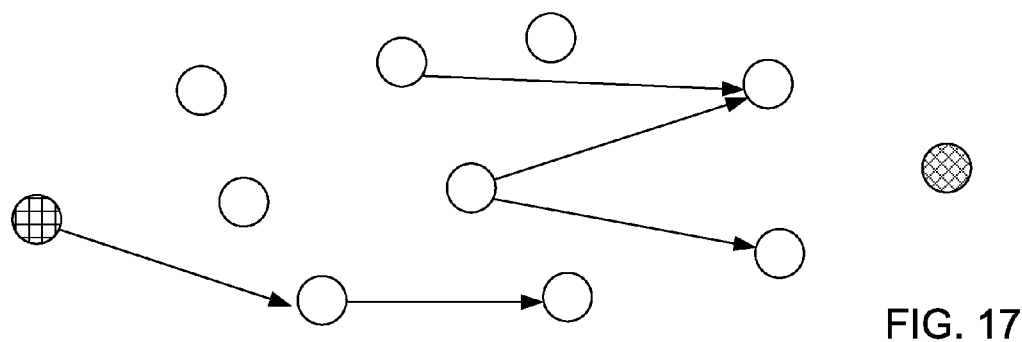
FIG. 17 is a data flow graph after the second critical edge and fan-in path is removed.
Figure 18:
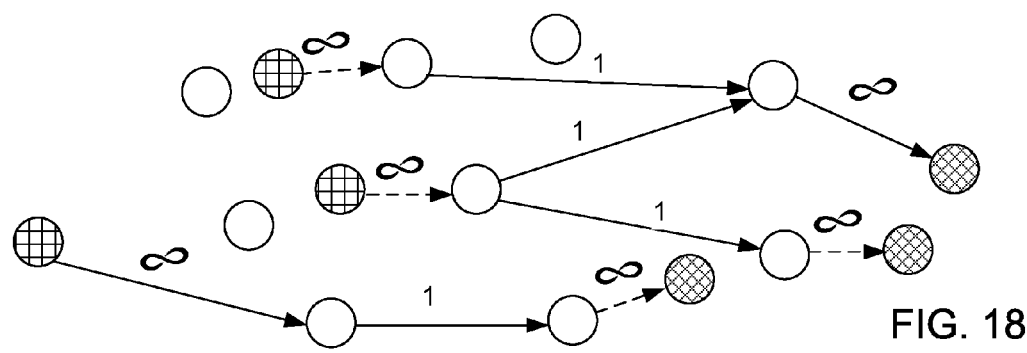
FIG. 18 is a data flow graph showing a second step of adding sources and sinks to dangling paths for implementing a minimum cut technique to enable pipelining the data flow graph of FIG. 15.
Figure 19:
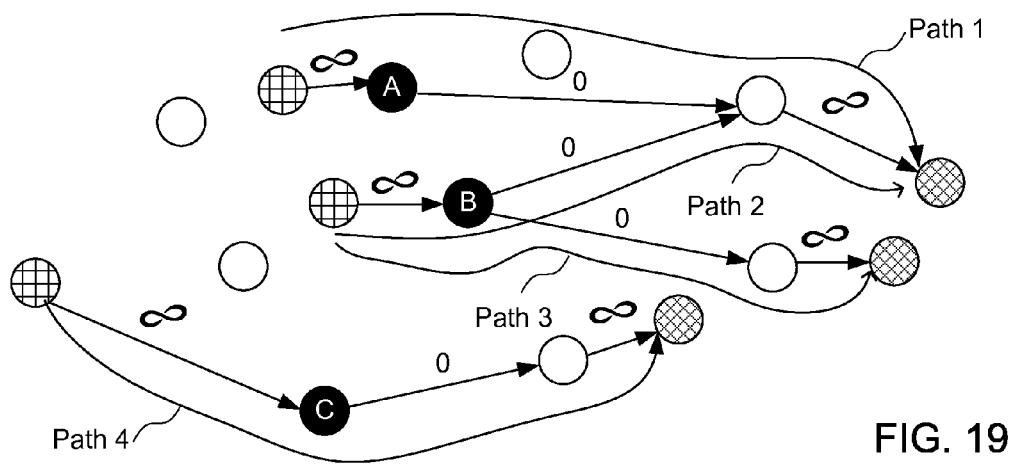
FIG. 19 is a data flow graph showing the designation of paths between sources and sinks of the data flow graph of FIG. 15.
Figure 20:
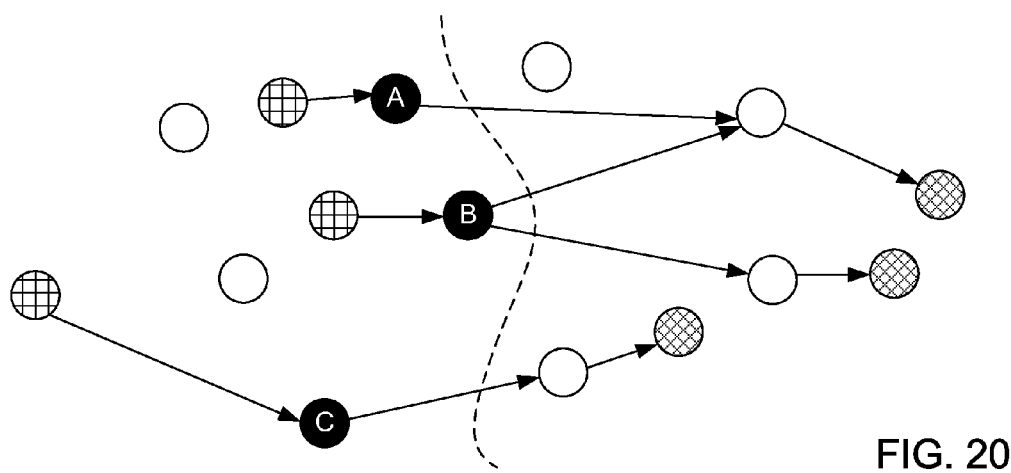
FIG. 20 is a data flow graph showing a minimum cut of the data flow graph of FIG. 15.
Figure 21:
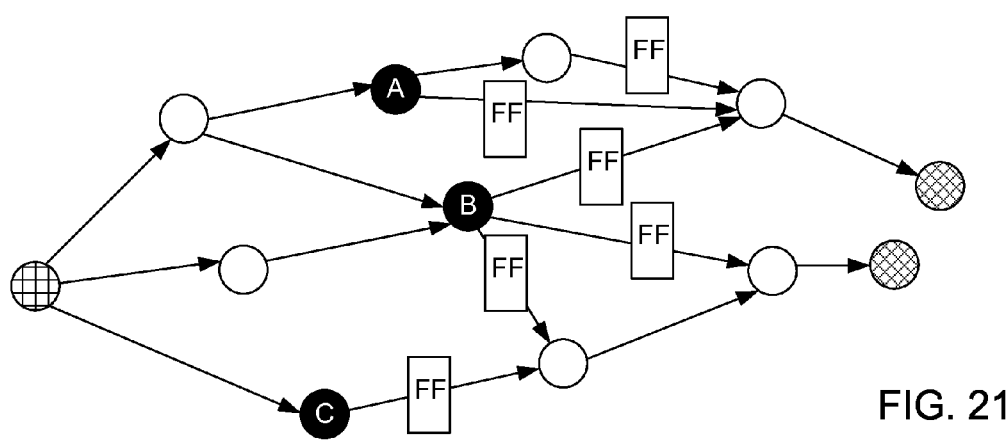
FIG. 21 is a data flow graph showing a final pipelined implementation of the data flow graph of FIG. 19.

A circuit diagram of FIG. 15 is provided to show the pipelining of a portion of a circuit having more than one critical edge. After finding a most critical edge (e.g., critical edge 1 as shown in FIG. 15) and the edges that are in series with the critical edge 1 are removed, a second critical edge (critical edge 2) is then identified as shown in FIG. 16. The resulting circuit arrangement after the second critical edge and the series edges associated with the second critical edge are removed is shown in FIG. 17. Sources and sinks are then added to dangling paths as shown in FIG. 18, as described above. As shown in FIG. 19, paths are identified, and a minimum cut is made as shown in FIG. 20. The resulting pipelined circuit is shown in FIG. 21. As is apparent, the resulting pipelined circuit arrangement of FIG. 21, which has two critical paths, is different than the pipelined circuit arrangement of FIG. 14. The determination of critical paths (i.e., the criteria for deciding whether a path is a critical path) can be implemented based upon a number of factors, such as the number of available registers or the number of iterations required to pipeline a circuit, for example.

Figure 22:
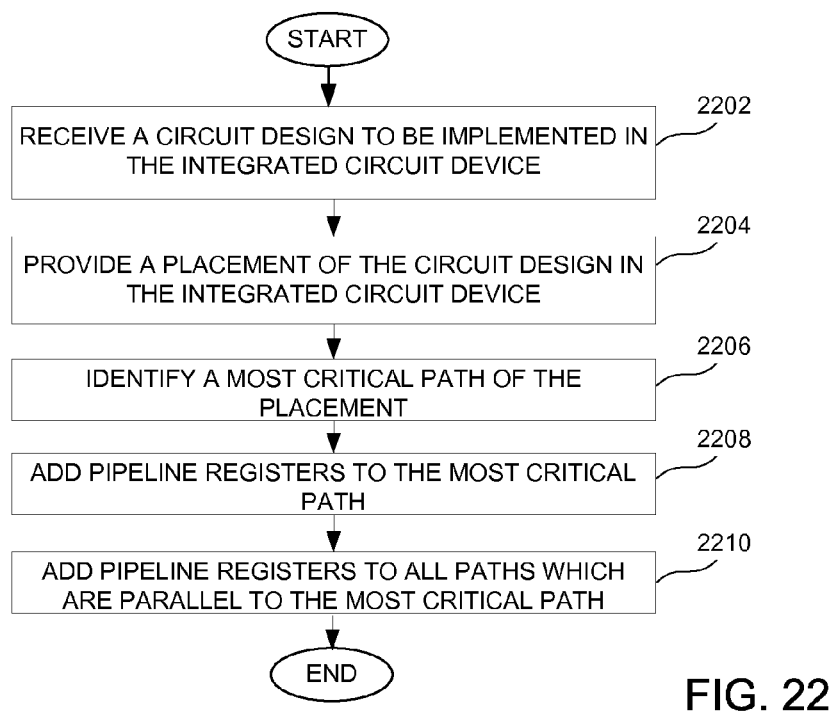
FIG. 22 is a flow chart showing a method of pipelining data.

Turning now to FIG. 22, a flow chart shows a method of pipelining data. In particular, a circuit design to be implemented in the integrated circuit device is received at a block 2202. A placement of the circuit design in the integrated circuit device is then provided at a block 2204, and a most critical path of the placement is identified at a block 2206. Pipeline registers are added to the most critical path at a block 2208, and then added to paths that are parallel to the most critical path at a block 2210. According to one implementation, the pipeline registers may be added to the multiple circuit paths as described above in reference to FIGS. 15-21.

Figure 23:
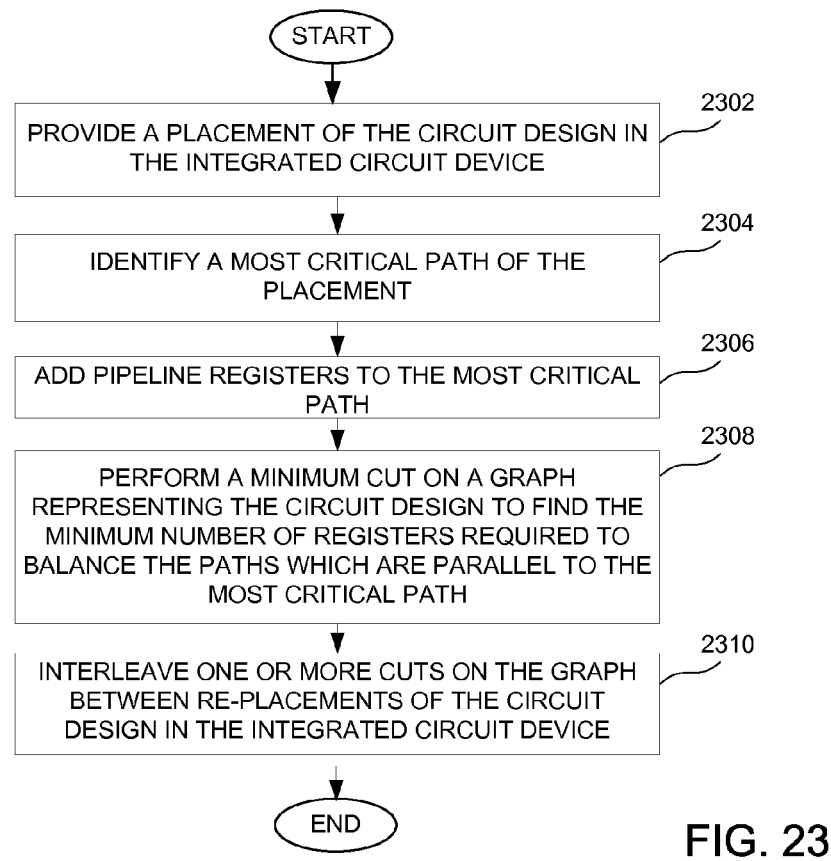
FIG. 23 is a flow chart showing another method of pipelining data.

Turning now to FIG. 23, a flow chart shows another method of pipelining data. In particular, a placement of the circuit design in the integrated circuit device is provided at a block 2302, and a most critical path of the placement is identified at a block 2304. Pipeline registers are added to the most critical path at a block 2306. Multiple critical paths may be pipelined as described above in reference to FIG. 22. A minimum cut on a graph representing the circuit design is performed to find the minimum number of registers required to balance the paths that are parallel to the most critical path at a block 2308. One or more cuts on the graph are then interleaved between replacements of the circuit design at a block 2310.

Turning now to FIG. 24, a flow chart shows a method of pipelining data paths. The method of FIG. 24 provides a process for efficiently pipelining data paths of a circuit, and more particularly minimizing the number of registers required for pipelining and optimizing the locations of the registers. Generally, static timing is run to find the most critical path of a circuit or a portion of a circuit. Delays on transitive fanin/fanouts of a critical edge of the most critical path are zeroed out (i.e., they are effectively treated as if they have already been traversed, and removed from the circuit). The process is repeated until no critical paths remain or no legal pipeline locations exist on the most critical paths. A minimum cut in the graph constrained by the set of pipelined parallel critical edges is then found to enable pipelining the graph. Incremental static timing is rerun after each set of parallel critical paths are found and pipelined.

More particularly, a target minimum period and iteration count is optionally specified at a block 2402. That is, it may be beneficial to terminate a pipelining process when a maximum frequency of operation of a circuit is achieved or after a certain number of iterations of pipelining is reached. The timing graph of a circuit design is converted to a data flow graph at a step 2404. This may be accomplished by reversing setup arc directions and removing clock related arcs. All feedback loops are then detected at step 2406. Because feedback loops cannot be pipelined, they are detected so that pipeline stages are not added to them. However, it should be noted that feedback loops can be retimed, and retiming can be performed them if certain feedback loops become critical. For example, the feedback path can be rerouted to provide a path having better timing. Illegal edges are then detected at a step 2408. As set forth above, an illegal edge is an edge that has no legal location to add a pipeline stage. Tarjan's SCC algorithm, for example, could be used to detect these paths by reversing illegal edges and checking for cycles that include interconnect edges. The last link of each feedback loop is broken at a block 2410 so that static timing can run correctly.

Static timing is run to find the most critical path at a block 2412. It is then determined if the most critical path is part of a feedback loop at a block 2414. That is, it is determined whether an edge was part of the previous loop. Because that edge could be feeding forwards or backwards in the original loop, it is necessary to detect edges in loops because pipelining anywhere in a loop results in functional differences (i.e., different data results) that are not desired. If the most critical path is part of a feedback loop, retiming is performed at a block 2416 with the goal of making it less critical, and incremental static timing is run at block 2418. If the same path is still critical at a block 2420 after retiming in performed at a block 2420, it is determined that no improvements in timing can be made and the process is exited at a block 2422.

If the same path is no longer the most critical path, and it is determined that the current most critical path is not a part of a loop at the block 2414, it is then determined whether the most critical path has a legal edge at a block 2424. If the most critical path can be pipelined (i.e., has at least one legal edge with a non-zero delay), a pipeline stage is added to the most critical edge of that path at a block 2426. All edges in the critical edge's transitive fanin and fanout cones are traversed and marked as illegal edges and assigned zero capacity at a block 2428. Assigning a zero capacity to all illegal edges has the net effect of preventing any edge in series with the recently pipelined edge from being pipelined on a current iteration.

It is then determined whether there are more critical paths that exist that are not in series with the pipelined path at a step 2430. If so, incremental static timing is again run at the block 2412 to find the most critical path by finding a new worst case endpoint. That is, the procedure of pipelining those paths and marking as illegal all serial edges is repeated until either no more legal edges remain or no more critical paths exist. It should be noted that static timing need not be rerun since all the paths that could be affected by the recently pipelined path are in series with it and are thus marked illegal. However, all endpoints must be re-checked to find the new most critical path.

For the remainder of the graph that is not critical and is legal, a min cut is performed on the graph at a block 2432 to find the minimal number of registers required to balance these remaining paths. In other words, all the paths that have not been pipelined for criticality reasons are balanced with the minimum number of resources. This may be accomplished by running a binary max flow algorithm for example to find the minimum cut on an undirected version of the data flow graph: All critical paths are given a capacity of zero. In addition, all 'dangling' edges (i.e., those with no predecessor edge or no successor edge) are tied to either a source or a sink. This effectively guarantees that the min-cut will pass through each critical edge where a register was added, but removes the edges from the graph to reduce runtime. It is equivalent to assigning infinite capacity to all upstream and downstream edges. All illegal edges are given a capacity of infinity, so that a min-cut cannot pass through an illegal edge. All directed edges are converted to undirected so that the minimum cut will not cut some paths more than once, which would violate functional correctness. Dinic's blocking flow algorithm may be implemented to find min cut.

Pipeline registers are added to all edges in the minimum cut at a block 2434, and edge delays are reinitialized at a block 2436, where some edge delays are set to zero as set forth above. If the pipeline cut iteration count has been reached at a step 2438, the design is re-placed, either incrementally or entirely, to allow the placer to find a new optimal placement given the extra slack that many critical paths will have at a block 2440. The iteration count is a variable that determines how many min cuts to make in the graph before re-placing and re-routing the design. If the iteration count is not reached, the min cut algorithm is re-run to find another min cut and the iteration count is incremented. For example, if iteration count is set to 5, then there will be 5 min cuts found before re-placing the design, and thus 5 sets of registers added to the design, so that every path through the design goes through exactly 5 newly added registers. The number of cuts (i.e., the iteration count) between each re-placement can be increased to reduce runtime or use an approximation algorithm to find the min cut to reduce run-time. Alternatively, instead of using binary max flow, multiple cuts in the graph could be selected at random where the best one is picked, which could be done in linear time. That is, rather than detecting a minimum cut, the run time can be reduced by using an approximation technique whereby one of a number of random cuts (i.e., an approximate minimum cut that may not necessarily be the optimal cut) would be selected. If it is determined that a target maximum frequency is not achieved at a block 2442, the process is repeated until the target maximum frequency is achieved a predetermined number of iterations is reached. Finally, if the most critical path does not have a legal edge at a block 2424, it is determined whether it is the first static timing pass at a block 2446. If so, the process is also exited at block 2422 when no critical paths could be pipelined (i.e., the most critical path has no legal edge). However, if one or more critical paths were pipelined already, then incremental static timing would have been run at least once, and so it would not be the first static timing pass. Then if no legal edge exists for the current most critical path, it is still determined whether there are any critical edges because there is a chance that the paths that did have registers added might be enough for the design to meet timing when it is re-placed and re-routed.

The various elements of the methods of FIGS. 21-23 may be implemented using the circuits of FIGS. 1-20 as described, or using some other suitable circuits. While specific elements of the method are described, it should be understood that additional elements of the method, or additional details related to the elements, could be implemented according to the disclosure of FIGS. 1-20.

It can therefore be appreciated that circuits for and methods of pipelining data have been described. It will be appreciated by those skilled in the art that numerous alternatives and equivalents will be seen to exist that incorporate the disclosed invention. As a result, the invention is not to be limited by the foregoing examples, but only by the following claims.

What is claimed is:

1. A method of pipelining a data path in an integrated circuit device, the method comprising:
   receiving, using a computer, a circuit design to be implemented in the integrated circuit device;
   providing a placement of the circuit design in the integrated circuit device;
   identifying a most critical path of the placement;
   performing a cut between a source node and a sink node of the placement;
   adding pipeline registers to a location after the cut of the most critical path; and
   adding pipeline registers to locations after the cut of all paths that are parallel to the most critical path.

2. The method of claim 1, wherein performing a cut between a source node and a sink node of the placement comprises performing a minimum cut on a graph representing the circuit design to find a minimum number of registers required to balance the paths that are parallel to the most critical path.

3. The method of claim 2, further comprising re-placing the circuit design after adding pipeline registers to the most critical path and the paths that are parallel to the most critical paths.

4. The method of claim 3, further comprising interleaving the re-placing the circuit design with one or more iterations of adding pipelines to critical paths.

5. The method of claim 2, wherein the minimum cut comprises an approximate minimum cut.

6. The method of claim 1, further comprising identifying feedback loops to avoid adding pipeline registers to the feedback loops.

7. The method of claim 1, further comprising identifying paths in series with the most critical path, and designating edges of the identified paths as illegal edges.

8. A method of pipelining a data path in an integrated circuit device, the method comprising:
   receiving, using a computer, a circuit design to be implemented in the integrated circuit device;
   providing a placement of the circuit design in the integrated circuit device;
   identifying a most critical path of the placement;
   adding pipeline registers to the most critical path;
   performing a minimum cut on a graph representing the circuit design to find the minimum number of registers required to balance paths that are parallel to the most critical path; and
   interleaving a re-placement of the circuit design with one or more iterations of adding pipeline registers to generate a pipelined placement of the circuit design.

9. The method of claim 8, wherein performing a minimum cut on the graph comprises adding pipeline registers to the paths that are parallel to the most critical path.

10. The method of claim 8, further comprising identifying a second critical path and adding pipeline registers to the second critical path before performing a minimum cut on the graph.

11. The method of claim 10, wherein interleaving a re-placement of the circuit design with one or more iterations of adding pipeline registers comprises interleaving a re-placement of the circuit design after an iteration count for iterations of adding pipeline registers has been reached.

12. The method of claim 8, further comprising detecting an illegal edge to avoid adding pipeline registers to the illegal edge.

13. The method of claim 8, further comprising identifying feedback loops to avoid adding pipeline registers to the feedback loops.

14. The method of claim 8, further comprising identifying paths in series with the most critical path, and designating edges of the identified paths as illegal edges.

15. A computer program product, comprising:
   a non-transitory computer-readable medium comprising computer-readable program code that transforms a circuit design to a placement configuration, the computer-readable program code comprising:
      computer-readable program code that receives the circuit design to be implemented in circuit blocks and memory elements of an integrated circuit;
      computer-readable program code that provides a placement of the circuit design in the integrated circuit device;
      computer-readable program code that identifies a most critical path of the placement;
      computer-readable program code that performs a cut between a source node and a sink node of the placement;
      computer-readable program code that adds pipeline registers to a location after the cut of the most critical path; and
      computer-readable program code that adds pipeline registers to locations after the cut of paths that are parallel to the most critical path.

16. The computer program product of claim 15, wherein the computer-readable program code that performs a cut performs a minimum cut on a graph representing the circuit design to find a minimum number of registers required to balance the paths that are parallel to the most critical path.

17. The computer program product of claim 16, further comprising computer-readable program code that re-places the circuit design after adding pipeline registers to the most critical path and the paths that are parallel to the most critical path.

18. The computer program product of claim 17, further comprising computer-readable program code that interleaves the re-placing the circuit design with one or more iterations of adding pipeline registers.

19. The computer program product of claim 15, further comprising computer-readable program code that detects an illegal edge to avoid adding pipeline registers to the illegal edge.

20. The computer program product of claim 15, further comprising computer-readable program code that identifies feedback loops to avoid adding pipeline registers to the feedback loops.

* * * * *